July 18, 1961
CHRISTIAN-MARIE-LUCIEN-LOUIS BOURCIER DE CARBON
2,992,864
SHOCK ABSORBERS
Filed Feb. 11, 1957
3 Sheets-Sheet 1
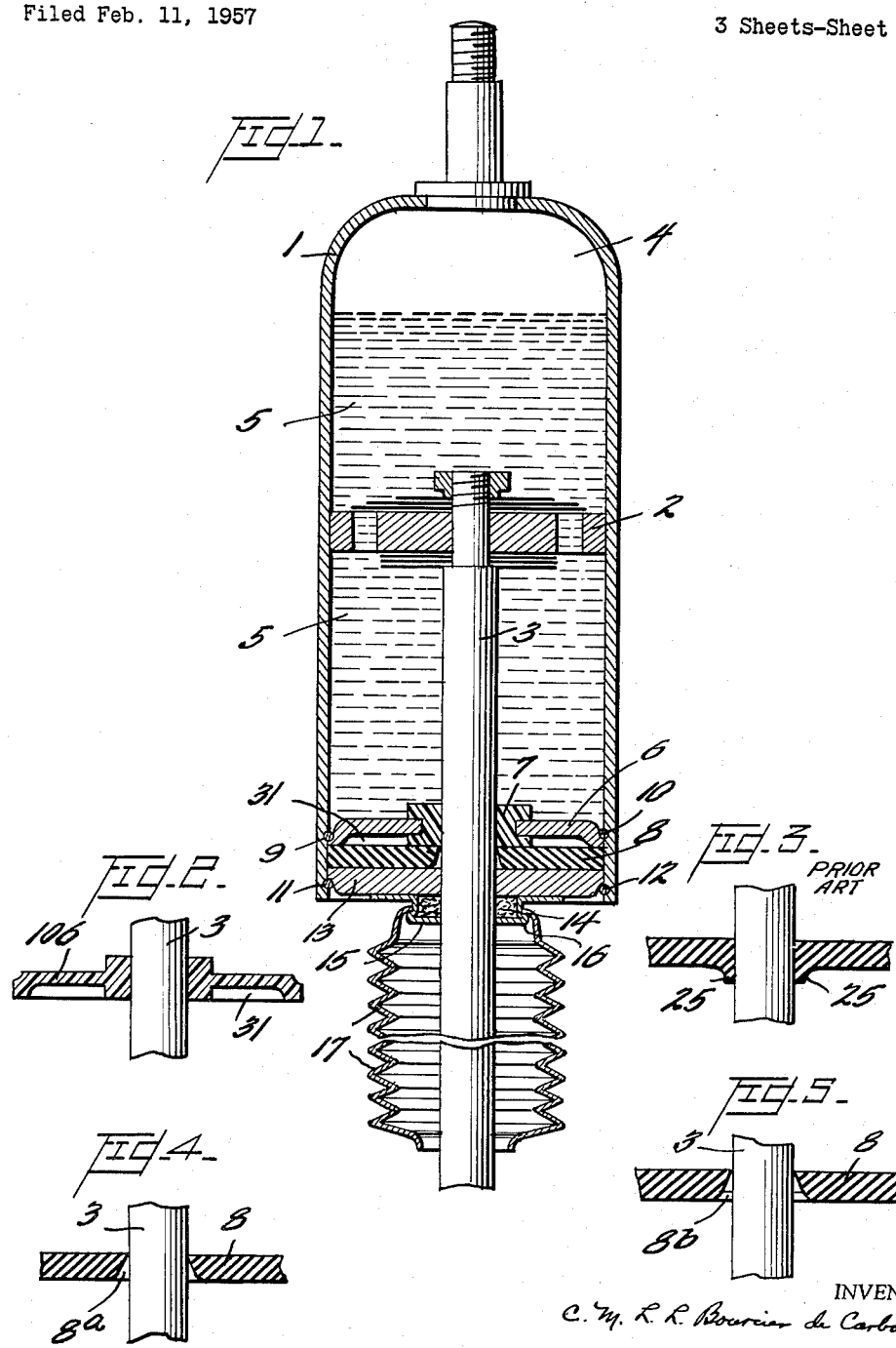
INVENTOR
C. M. L. L. Bourcier de Carbon
BY Watson, Cole, Grindle & Watson
ATTORNEYS

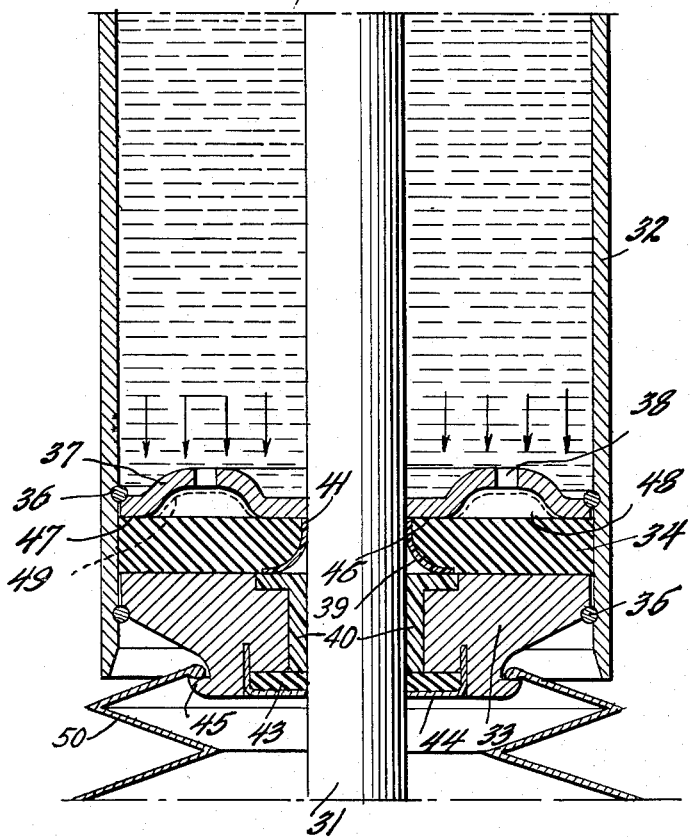
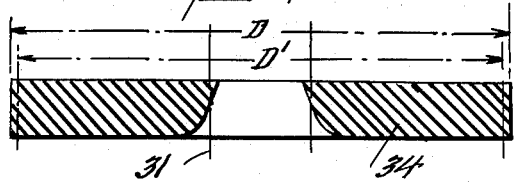

July 18, 1961
CHRISTIAN-MARIE-LUCIEN-LOUIS BOURCIER DE CARBON
2,992,864
SHOCK ABSORBERS
Filed Feb. 11, 1957
3 Sheets-Sheet 3
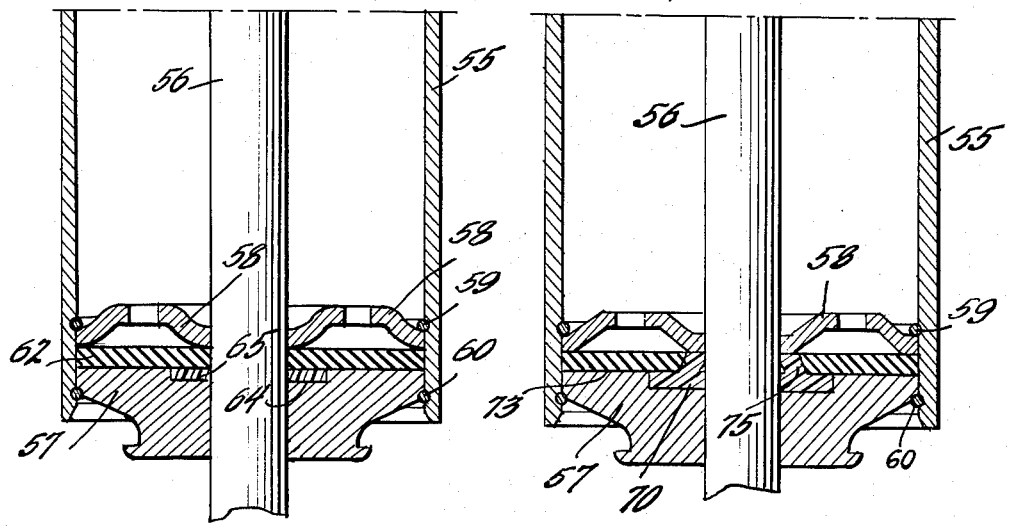
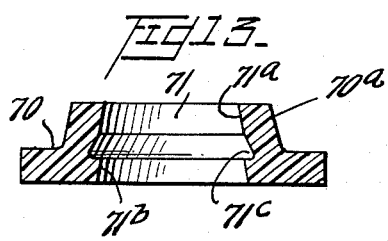
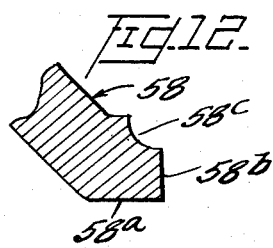
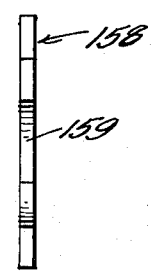
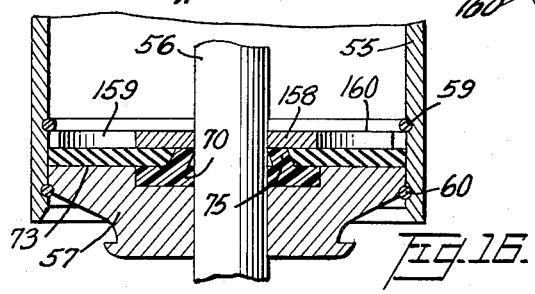
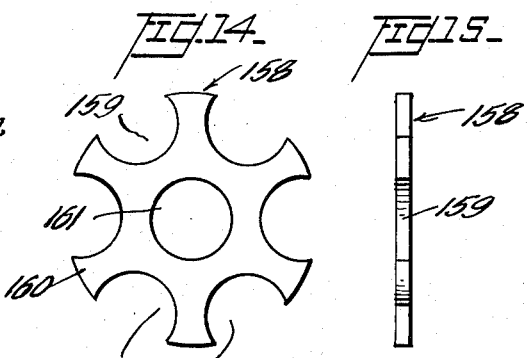
INVENTOR
C. M. L. L. Bourcier de Carbon
BY Watson, Cole, Grindle & Watson
ATTORNEYS

United States Patent Office 2,992,864
Patented July 18, 1961

2,992,864
SHOCK ABSORBERS
Christian-Marie-Lucien-Louis Bourcier de Carbon,
64 Blvd Maurice Barres, Neuilly-sur-Seine, France
Filed Feb. 11, 1957, Ser. No. 639,552
Claims priority, application France Jan. 23, 1954
6 Claims. (Cl. 308—3.5)

This invention relates to improvements in sealing means for high pressure containers or enclosures and more particularly for sealing devices for reciprocating members such as piston rods of telescoping shock absorbers or the like.

This application is a continuation-in-part of my co-pending application Serial No. 482,319, filed January 17, 1955, and now abandoned.

The general object of the invention is to provide a novel and improved sealing arrangement of the type in which one or more discs, washers, or gaskets of elastic material such as rubber, and certain types of plastic materials, are arranged or sandwiched between two rigid confining plates or discs, these laminated elements, of course, being provided at the center of the assemblage with an opening permitting the passage of the rod or shaft.

Sealing means for telescoping shock absorbers and similar arrangements have frequently exhibited the drawback of no longer assuring perfect fluid-tightness after a certain period of operation. Frequently the loss of oil or other damping medium resulting from such deficiencies makes it necessary to remove the shock absorber, refill it with oil, replace the packing and re-assemble the arrangement, all of which causes loss of time and adds to the expense of maintenance. The present invention overcomes this deficiency in that improved packing or sealing arrangements are provided which are of long life and which do not require frequent servicing.

In its preferred embodiments, the invention contemplates the provision of the following novel features taken either alone or in combination.

One of the novel features of the invention consists in providing a guide sleeve for the piston rod, which guide sleeve is made of plastic material such as superpolyamide or superpolyester, for example the material known by the name of nylon. This may be effected either by making the inner confining disc or plate of one of these plastic materials in its entirety, or by providing said inner confining plate with an attached guide sleeve made of one of these selected plastic materials.

These materials have the advantage that they are not sensitive to oil and that when they are lubricated (which takes place automatically due to the movements of the rod of the shock absorber) they constitute a very good guide surface for the rod, with a very low coefficient of friction, while at the same time reducing wear to a minimum. Preferably the side plates on both sides of the rubber or rubber-like sealing disc are of metal in order to supply high mechanical strength to the joint or seal.

Another feature of the invention is the provision of an oil soaked felt gasket or the like at the outer side of the sealing assembly, which gasket is adapted to be fastened to the assemblage by any suitable means, for example, by means of a metal cap fastened by welding to the outer confining plate or disc of the joint. The felt gasket serves the purpose of preventing mud and dirt from entering the joint and causing premature wear. It furthermore assures excellent protection against rust due to the oil film which it maintains on the rod extending exteriorly of the shock absorber.

This protection can be enhanced, in accordance with the present invention, by the addition to the oil damping medium of the shock absorber of a special anti-corrosion product such as a silicon compound, or the use of a silicon oil.

Further in accordance with the invention, the metal cap surrounding the felt wiping gasket is handily provided with suitable means for attaching a protective bellows or boot provided to prevent deposits of mud and dust on the protruding portions of the rod. In particular, the cap is provided with a rim or flange about which the boot or bellows may be secured. This makes it possible to use a bellows of a diameter considerably less than or at least equal to that of the body of the shock absorber.

A further feature of the invention involves the use of intermediate elastic discs or washers in the seal, such as rubber discs having at the center an opening which is not cylindrical, as is customarily the case, but conical, the lip of the opening of smaller diameter being toward the inside of the shock absorber.

Furthermore, the lip which is in contact with the outer side plate or disc is rounded or bevelled, this arrangement having the purpose of avoiding being forced into the space between the outer confining plate and the piston rod, under the influence of the substantial pressures which develop during operation, and thus eliminating one focal point of rapid wear or deterioration.

Other objects include the provision of certain particular configurations of the inner one of the packing or sealing ring enclosing washers. One novel feature is the provision of a convex washer for permitting a certain amount of deformation under the action of the pressure of installation during assembly, which facilitates the insertion of the retaining clip elements. The provision of perforations in such a plate so as to permit internal pressure to hold the flexible sealing ring against the outer plate and also to press it against the piston rod and cylinder walls is also a novel feature of the invention. This ensures sufficient pressure on the cylinder walls and piston rod so that the seal is hermetic whether the device is in operation or idle.

Other objects include the cementing or molding of the flexible washer to the outer plate and the provision of wiping means made of rubber or plastic near the outer portion of the seal.

Then again it is a feature of the invention to provide an anti-friction sleeve, where the outer plate is employed as a guide for the piston rod, which sleeve may be made of powdered metal, plastic such as Teflon or nylon or other material of even more anti-friction qualities, or a superpolyamide or superpolyester, in which case the inner seal of the upper plate may possibly be eliminated. Also, a thin seal of a material with a very good coefficient of friction may be inserted between the sealing washer or ring and the piston rod, the seal being sufficiently deformable to be correctly held against the rod by the washer or ring. This inner seal is preferably made of vulcollan. Also, the seal serving as a guide for the piston rod, and the one interposed between the washer or ring and the rod to improve sliding qualities may be combined in a single part.

Other objects and features of novelty will be apparent from the following specification when read in connection with the accompanying drawings in which certain embodiments of the invention are illustrated by way of example.

In the drawings:

FIGURE 1 is a vertical section of a shock absorber embodying the principles of the invention;

FIGURE 2 shows a variation of construction of the inner confining disc for the packing arrangement;

FIGURE 3 shows a typical deformation of a sealing gasket in prior art devices, which should be avoided;

FIGURES 4 and 5 show in diametric section intermediate washers of elastic material, in variant shapes;

FIGURE 6 is a fragmentary diametric vertical cross-sectional view through a modified embodiment of the invention;

FIGURE 7 is a diametric cross-sectional view taken through a rubber or plastic sealing washer employed in this embodiment of the invention and adaptable for the other embodiments;

FIGURE 8 is a view similar to FIGURE 6 but showing still another modification of the seal;

FIGURE 9 is a diametric section through one of the sealing washers employed in the variation shown in FIGURE 8;

FIGURE 10 is a similar view through an anti-friction washer employed in the same embodiment;

FIGURE 11 is a view similar to FIGURE 8 but showing a still further modification of the subject of the invention;

FIGURE 12 is a fragmentary radial sectional view of the peripheral edge of one of the sealing washer retaining rings;

FIGURE 13 is a diametric sectional view through one of the anti-friction washers against which the piston rod slides in this embodiment;

FIGURES 14 and 15 are plan and vertical sectional views through one of the inner retaining washers in a modified form thereof; and FIGURE 16 is a vertical sectional view similar to FIGURE 11 but embodying the inner relieved retaining washer shown in FIGURES 14 and 15.

In the shock absorber selected for illustration in FIGURES 1–5 inclusive of the drawings the cylinder 1 is secured by suitable means to one of the members, the movement of which is to be damped, preferably the chassis of the motor vehicle; and the piston 2 moving in the cylinder 1 is adapted to be secured to the other member, for example, the wheel mounting by means of the piston rod 3. The liquid damping medium, preferably a suitable oil, is shown at 5 and a volume of gas under pressure is indicated at 4 in the top of the cylinder as it is applied to the vehicle.

The piston rod 3 emerges from the cylinder through the lower end thereof and passes through an opening in a sealing joint which comprises the following parts; an inner confining plate 6 having a central guide sleeve 7 of plastic material such as a superpolyamide or superpolyester, for example nylon, the guide sleeve being flanged to receive the inner margins of the metal disc 6 and provided with an opening snugly fitting the piston rod 3; an elastic washer 8 which may be of natural or synthetic rubber and an outer cheek plate or confining disc 13 preferably made of metal.

Two annular grooves 9 and 11 preferably of semicircular cross-section, are provided along two axially spaced circles on the inner surface of the cylinder 1. These grooves are for receiving the circlips 10 and 12 respectively which are split annular wire rings adapted to be snapped into the grooves and intended to hold the parts of the joint or sealing assembly in position.

Beneath the external confining plate or disc 13 there is secured as by welding a metal cap 15, in which is disposed an oil-soaked felt gasket which snugly surrounds and wipes the piston rod 3.

The cap 15 is provided with a rim or shoulder 16 which provides means for snapping the upper end of the bellows 17 into the position to support it about the piston rod. The lower end of the bellows is of slightly greater diameter than the piston rod and the bellows in its entirety can be made of considerably less diameter than that of the cylinder 1 of the shock absorber.

As shown in FIGURE 2 of the drawings the entire inner disc 106 may be made of nylon or similar plastic instead of using the separate central sleeve 7. Experience has shown that very satisfactory guidance of the piston rod is obtained by the use of a plastic substance of this type. It has a very low coefficient of friction and furthermore it is sufficiently resistant to wear, due to the fact that under these conditions of use it is automatically lubricated. It is also insensitive to the action of the oil used.

It is also advantageous that the inner disc 6 or 106 be provided with a recessed space of the shape indicated at 31 in FIGURES 1 and 2 of the drawings, this permitting some expansion of the rubber gasket 8 during the mounting operation described below. The outer confining plate 13 is of metal so as to afford sufficient mechanical strength to the seal.

As indicated in FIGURES 1, 4 and 5 of the drawings the elastic washer 8 is provided at its center, not with a cylindrical opening as is customary in the case of such sealing gaskets, but with a conical hole, having a lip of smaller diameter at the inner side of the hole toward the interior of the shock absorber. The lip or margin of the opening which is adjacent the outer plate 13 is either rounded as shown at 8a in FIGURE 4, or bevelled as indicated at 8b in FIGURE 5 of the drawings.

This special configuration of the hole in the elastic washer eliminates the drawback noted in connection with washers having cylindrical openings, wherein the lip resting on the outer plate, under the action of high pressure occurring during the operation of the shock absorber, is forced into the space between the outer plate and the piston rod. The sort of bulges indicated at 25 in FIGURE 3 of the drawings, which form in this manner, cause rapid wear of the elastic washer as well as a greater than normal wear of the piston rod itself.

With regard to the elastic washer 8 which forms the principal element of the sealing joint, it is advantageous to give it such dimensions that, before it is placed in position in the housing or casing of the shock absorber, the central opening has a diameter greater than or at least equal to that of the piston rod, the snug fitting of the washer to the rod being assured by the compression of the washer within the housing in such manner that the rubber fibers in contact with the rod are in compression with respect to their natural relaxed condition, instead of being in expansion, this provision being favorable for resistance to wear.

The embodiment illustrated in FIGURE 6 of the drawings comprises a shock absorber in which the working liquid is subjected to considerable pressure, as described in my United States Patents Nos. 2,721,074 and 2,774,446. In this example the piston rod 31 emerges from the cylinder 32 through a packing assembly constructed as follows. An outer confining plate or disc 33 of the same general configuration as those previously described may be made of powdered metal and have an enlarged internal opening into which is fitted a bushing or sleeve 40 made of plastic material such as a superpolyamide or a superpolyester such as nylon, or possibly of another anti-friction plastic vulcollan. Alternatively, this seal may be made of powdered metal or in certain usages may be eliminated entirely.

Between the outer plate 33 and an inner confining plate 37 is disposed an annular washer 34 made of rubber or similar elastic material. The inner plate 37 is preferably provided with an annular embossment which is perforated as at 38 so that the liquid passing freely through the plate exerts its pressure on the ring or washer 34 and compresses it strongly against the outer plate 33. Thus, because of the elasticity of the rubber, and because ring 34 is rather thick (preferably about two to eight millimeters) it is pressed laterally against the outer cylinder and against the piston rod simultaneously. In certain extreme circumstances, the inner plate 37 could be eliminated as where the internal pressure of the liquid is sufficient to hold the washer 34 against the plate 33; however, it is preferable to utilize the inner plate in most all constructions to prevent any deformation of the lip 41 of the washer 34 under the effect of the movement of the piston rod 31.

The annular convexity of the inner plate 37 provides for pressure against the washer or ring 34 only along its inner annular portion 46 or outer peripheral portion 47, leaving an intermediate space 48 free from contact. This arrangement has the effect not only of ensuring free access of the pressurized liquid to a very large part of the surface of the washer 34, but also permits deformation of the latter until it may take the form shown by the dotted line 49, during the application of external force when the seal is being installed, which force presses the assemblage inward until the circlips 35 and 36 snap into place.

Preferably in this embodiment and in certain similar ones, the ring or washer 34 is provided with an initial outer diameter D which is greater than the inner diameter D' of the cylinder, as shown in FIGURE 7. The central hole through which the piston rod passes is preferably conical as already described in connection with certain other embodiments, the lip with the smallest diameter being on the inner side of the assemblage, and the lip which is in contact with the outer plate 33 being rounded or bevelled.

Under these conditions the washer or ring 34 is pressed against the piston rod under the influence of both the reduction of the initial diameter D to the value D', and of the considerable pressure exerted on its upper surface. In spite of this pressure, it should not be feared that the lower lip of said ring or washer will be dislodged in the play existing between the plate and the piston rod, because of its incurved form, and thus become a source of wear or rapid deterioration. Nor should it be feared that the upper lip 41 of the washer will curve inwardly because of the presence of inner plate 37. The seal may be still further improved, according to the present invention especially as regards resistance to wear, by the interposition of a flexible membrane 39 of some material which has a very good coefficient of friction, between the washer 34 and rod 31. This membrane may be made of Teflon or of vulcollan if desired. The thickness of such membrane should be quite slight, for example, about 0.2 to 0.8 millimeter.

It should also be noted that instead of clamping the washer or ring 34 between the two plates, it may be made to adhere to the surface of the outer plate 33 throughout part or all of its contact, by cementing or bonding directly to the outer plate. This part may be made by direct molding to an outer plate made of powdered metal.

If desired, a protective seal consisting of a ring 43 may be provided at the outer surface of the plate 33 and held in place by a metal cupel 44 which can be driven forcibly into an annular groove formed in the plate 33. This ring 33 acts as a wiper and prevents mud, dust, etc. from penetrating the seal. The plate 33 may also include an outer flange 45 upon which the protective bellows 50 may be mounted.

In the embodiment shown in FIGURES 8–10 of the drawings a portion of the cylinder wall is indicated at 55 and a fragmentary showing of the piston rod is at 56. The packing arrangement in this instance comprises the outer metallic member 57 of a construction already described and the bulged inner plate 58, these two metal parts being held in place by means of the circlips 59 and 60.

Between the two metal plates there is disposed the rubber disc 62 which extends from wall to wall of the cylinder 55 and has an axial opening 63 (shown best in relaxed form in FIGURE 9) this opening having tapered walls as described in previous embodiments.

Within an annular orifice or pocket 64 in the bottom member 57 there is disposed a smaller disc of vulcollan indicated at 65. This plate or disc also has a central opening of frusto-conical form as indicated at 66.

In the embodiment shown in FIGURES 11–13 of the drawings the same type of metallic bounding plates 57 and 58 are employed held within the end of the cylinder 55 as by means of the circlips 59 and 60. In this case, however, the central vulcollan member 70 is stepped and has two external diameters as clearly shown in FIGURE 13 of the drawings, but with its central opening 71 provided with a taper as before. However, in this embodiment the rubber disc 73 is made to fit around the tapering smaller diameter 70a of the vulcollan member by the provision of an enlarged central opening 75 also tapered to correspond to that of the vulcollan member 70.

In FIGURE 13 the desired configuration of the vulcollan element is clearly shown, the upper inner tapered wall shown at 71a, and the lower tapered wall in substantial alignment therewith indicated at 71b, with an intermediate annular recess 71c.

In FIGURE 12 of the drawings one suggested configuration of the cross-section of the outer periphery of the ring 58 is shown where an annular footing surface 58a rests upon the margins of the rubber ring 73, an outer surface 58b faces the wall 55 of the cylinder and an annular quarter-round groove 58c is provided to accommodate a portion of the circlip 59.

An alternative form of upper plate member which can be employed in lieu of the one illustrated at 58, is shown at 158 in FIGURES 14 and 15 of the drawings. This plate is preferably flat and star-shaped being provided with large notches 159 around its periphery which leaves blades or projections 160 which bear upon the rubber disc. The circular opening 161 surrounds the piston rod. In this embodiment the portions of the rubber disc are allowed to give way or expand into the openings provided by the notches 159 and this assists in accommodating the application of the bottom metal member 57 which necessarily has to be applied with some pressure in order that the snap ring or circlip 60 may be properly applied.

Vulcollan is a rather new plastic material whose qualities (namely, exceedingly great resistance to wear and a very slight coefficient of friction on steel) permit the attainment of sealing joints which are quite remarkable, giving the shock absorber a much smoother ride than with the use of rubber joints that have always had a tendency to stick to the piston rod. However, the use of vulcollan in connection with rubber is preferred in many cases since the rubber is less likely to contract over a period of time than the vulcollan while the vulcollan insert provides a much better sliding joint with the piston rod.

Various changes and modifications may be made in the embodiments illustrated and described herein without departing from the scope of the invention as defined by the following claims.

Having thus described the invention, what is claimed as new and desired to be secured by Letters Patent is:

1. A true shock absorber of the direct acting piston and cylinder type adapted to be used in conjunction with a spring suspension, which shock absorber comprises a cylinder containing a working liquid, a piston disposed in said cylinder for reciprocation in said liquid, and a piston rod fixed at one end to said piston for extending outwardly from said cylinder at one end of the latter; said piston rod being of an external diameter which is considerably less than one-half the internal diameter of said cylinder, which ratio characterizes a true shock absorber of the type described as opposed to any hydraulic suspension devices; the end of said cylinder through which the rod extends having side walls terminating in a cylindrical configuration without any substantial diminution in diameter; an end wall structure for that end of the cylinder having a circular area only slightly smaller than the cross-sectional area of the cylinder proper, the difference being substantially accounted for by the cross-sectional area of said relatively narrow shock absorber piston rod; said end wall structure comprising a sandwich of relatively broad and flat discs having outer diameters approximately equal to the internal diameter of the cylinder wall, all of said discs having central openings through which said piston rod extends; the outermost of said discs comprising a rigid annular plate; an intermediate disc comprising a broad flat annular rubber-like element which is elastically deformable but relatively incompressible, and which has an outside diameter more than twice its internal diameter and more than five times the axial thickness of the rubber-like disc; and an inner broad flat disc of rigid material; and means for securing said sandwich of discs in closely packed relationship within said otherwise open end of said cylinder; said innermost disc being relieved at intermediate portions of its area but having inner and outer portions bearing upon said intermediate disc at its radially inner and outer peripheral portions; said intermediate disc being, in initial relaxed condition before application, of such an internal and external diameter as to firmly abut the inner walls of the cylinder and bear with sliding sealing contact against the walls of the piston rod when installed; an abutment projecting radially inwardly from the side walls of the cylinder inwardly of the sandwich of discs, an annular groove in the said side walls outwardly of the sandwich of discs, and a circlip adapted to be snapped into said outwardly disposed groove to bear against the outer surface of said outermost disc to hold the said sandwich of discs firmly in place, the reliefs in the inner disc affording room for displacement of portions of the deformable but incompressible intermediate disc upon the application of pressure to the outer disc in the process of installing the circlip.

2. A true shock absorber of the direct acting piston and cylinder type adapted to be used in conjunction with a spring suspension, which shock absorber comprises a cylinder containing a working liquid, a piston disposed in said cylinder for reciprocation in said liquid, and a piston rod fixed at one end to said piston for extending outwardly from said cylinder at one end of the latter; said piston rod being of an external diameter which is considerably less than one-half the internal diameter of said cylinder, which ratio characterizes a true shock absorber of the type described as opposed to any hydraulic suspension devices; the end of said cylinder through which the rod extends having side walls terminating in a cylindrical configuration without any substantial diminution in diameter; an end wall structure for that end of the cylinder having a circular area only slightly smaller than the cross-sectional area of the cylinder proper, the difference being substantially accounted for by the cross-sectional area of said relatively narrow shock absorber piston rod; said end wall structure comprising a sandwich of relatively broad and flat discs having outer diameters approximately equal to the internal diameter of the cylinder wall, all of said discs having central openings through which said piston rod extends; the outermost of said discs comprising a rigid annular plate; an intermediate disc comprising a broad flat annular rubber-like element which is elastically deformable but relatively incompressible, and which has an outside diameter more than twice its internal diameter and more than five times the axial thickness of the rubber-like disc; and an inner broad flat disc of rigid material; and means for securing said sandwich of discs in closely packed relationship within said otherwise open end of said cylinder; said innermost disc being relieved at intermediate portions of its area but having inner and outer portions bearing upon said intermediate disc at its radially inner and outer peripheral portions; said intermediate disc being, in initial relaxed condition before application, of such an internal and external diameter as to firmly abut the inner walls of the cylinder and bear with sliding sealing contact against the walls of the piston rod when installed; an abutment projecting radially inwardly from the side walls of the cylinder inwardly of the sandwich of discs, an annular groove in the said side walls outwardly of the sandwich of discs, and a circlip adapted to be snapped into said outwardly disposed groove to bear against the outer surface of said outermost disc to hold the said sandwich of discs firmly in place, the reliefs in the inner disc affording room for displacement of portions of the deformable but incompressible intermediate disc upon the application of pressure to the outer disc in the process of installing the circlip, at least some of the relieved portions of the inner disc passing all the way through said inner disc, whereby the pressure of the working liquid is transmitted to the intermediate disc to urge it axially into flat condition and radially into firm sealing contact with the piston rod.

3. A true shock absorber of the direct acting piston and cylinder type adapted to be used in conjunction with a spring suspension, which shock absorber comprises a cylinder containing a working liquid, a piston disposed in said cylinder for reciprocation in said liquid, and a piston rod fixed at one end to said piston for extending outwardly from said cylinder at one end of the latter; said piston rod being of an external diameter which is considerably less than one-half the internal diameter of said cylinder, which ratio characterizes a true shock absorber of the type described as opposed to any hydraulic suspension devices; the end of said cylinder through which the rod extends having side walls terminating in a cylindrical configuration without any substantial diminution in diameter; an end wall structure for that end of the cylinder having a circular area only slightly smaller than the cross-sectional area of the cylinder proper, the difference being substantially accounted for by the cross-sectional area of said relatively narrow shock absorber piston rod; said end wall structure comprising a sandwich of relatively broad and flat discs having outer diameters approximately equal to the internal diameter of the cylinder wall, all of said discs having central openings through which said piston rod extends; the outermost of said discs comprising a rigid annular plate; an intermediate disc comprising a broad flat annular rubber-like element which is elastically deformable but relatively incompressible, and has an outside diameter more than twice its internal diameter and more than five times the axial thickness of the rubber-like disc; and an inner broad flat disc of rigid material; and means for securing said sandwich of discs in closely packed relationship within said otherwise open end of said cylinder; said innermost disc being relieved at intermediate portions of its area but having inner and outer portions bearing upon said intermediate disc at its radially inner and outer peripheral portions, said intermediate disc being in initial relaxed condition before application of such an internal and external diameter as to firmly abut the inner walls of the cylinder and bearing with sliding sealing contact against the walls of the piston rod when installed; said intermediate deformable disc comprising two parts, a radially inward part comprising an annular washer of self-lubricating plastic closely surrounding said piston rod and comprising a minor portion of the diameter of the entire intermediate disc, and a broad flat surrounding disc portion encircling the washer and compressed between the washer and the walls of said cylinder to exert radially inward pressure against the washer to hold it in firm sealing contact with the piston rod; said plastic washer being of stepped formation having a narrow inwardly directed portion embraced as described by the surrounding disc portion; and an axially outward portion of greater diameter and underlying the central marginal portion of said surrounding central marginal part of said surrounding portion, and seated in an annular recess formed in the inner surface of the outermost disc of the sandwich.

4. A true shock absorber of the direct acting piston and cylinder type adapted to be used in conjunction with a spring suspension, which shock absorber comprises a cylinder containing a working liquid, a piston disposed in said cylinder for reciprocation in said liquid, and a piston rod fixed at one end to said piston for extending outwardly from said cylinder at one end of the latter; said piston rod being of an external diameter which is considerably less than one-half the internal diameter of said cylinder which ratio characterizes a true shock absorber of the type described as opposed to any hydraulic suspension devices; the end of said cylinder through which the rod extends having side walls terminating in a cylindrical configuration without any substantial diminution in diameter; an end wall structure for that end of the cylinder having a circular area only slightly smaller than the cross-sectional area of the cylinder proper, the difference being substantially accounted for by the cross-sectional area of said relatively narrow shock absorber piston rod; said end wall structure comprising a sandwich of relatively broad and flat discs having outer diameters approximately equal to the internal diameter of the cylinder wall, all of said discs having central openings through which said piston rod extends; the outermost of said discs comprising a rigid annular plate; an intermediate disc comprising a broad flat annular rubber-like element which is elastically deformable but relatively incompressible, and has an outside diameter more than twice its internal diameter and more than five times the axial thickness of the rubber-like disc; and an inner broad flat disc of rigid material; and means for securing said sandwich of discs in closely packed relationship within said otherwise open end of said cylinder; said innermost disc being relieved at intermediate portions of its area but having inner and outer portions bearing upon said intermediate disc at its radially inner and outer peripheral portions; said intermediate disc being, in initial relaxed condition before application, of such an internal and external diameter as to firmly abut the inner walls of the cylinder and bear with sliding sealing contact against the walls of the piston rod when installed; said rigid inner disc being of star-shaped construction having outwardly radiating arms spaced apart circumferentially at their outer ends but bearing the said ends upon the outer peripheral portion of said intermediate incompressible deformable disc and providing apertures between said arms through which portions of said broad flat intermediate disc may flow upon the application of compressive forces during the installation of the sandwich, and through which pressure liquid may during operation of the shock absorber exert pressure to maintain the broad flat intermediate flexible disc in flat condition to exert radial pressure for properly sealing the movements of the piston rod.

5. A true shock absorber of the direct acting piston and cylinder type adapted to be used in conjunction with a spring suspension, which shock absorber comprises a cylinder containing a working liquid, a piston disposed in said cylinder for reciprocation in said liquid, and a piston rod fixed at one end to said piston for extending outwardly from said cylinder at one end of the latter; said piston rod being of an external diameter which is considerably less than one-half the internal diameter of said cylinder, which ratio characterizes a true shock absorber of the type described as opposed to any hydraulic suspension devices; the end of said cylinder through which the rod extends having side walls terminating in a cylindrical configuration without any substantial diminution in diameter; an end wall structure for that end of the cylinder having a circular area only slightly smaller than the cross-sectional area of the cylinder proper, the difference being substantially accounted for by the cross-sectional area of said relatively narrow shock absorber piston rod; said end wall structure comprising a sandwich of relatively broad and flat discs having outer diameters approximately equal to the internal diameter of the cylinder wall, all of said discs having central openings through which said piston rod extends; the outermost of said discs comprising a rigid annular plate; an intermediate disc comprising a broad flat annular rubber-like element which is elastically deformable but relatively incompressible, and has an outside diameter more than twice its internal diameter and more than five times the axial thickness of the rubber-like disc; and an inner broad flat disc of rigid material; and means for securing said sandwich of discs in closely packed relationship within said otherwise open end of said cylinder; said innermost disc being relieved at intermediate portions of its area but having inner and outer portions bearing upon said intermediate disc at its radially inner and outer peripheral portions; said intermediate disc being, in initial relaxed condition before application, of such an internal and external diameter as to firmly abut the inner walls of the cylinder and bear with sliding sealing contact against the walls of the piston rod when installed; the outermost disc being provided with an axially outward extension of small diameter as compared with the diameter of the cylinder, said projection being outwardly shouldered to provide a groove for the snapping on of the upper end of a protective boot for said piston rod.

6. The packing device as set forth in claim 3 in which the inner marginal surface of the annular plastic washer is of generally frusto-conical configuration in its relaxed form and of somewhat smaller diameter than the piston rod whereby when applied to the rod the inner margin of the washer assumes by distortion a substantially cylindrical shape, and an annular groove is formed in said inner surface intermediate the top and bottom surfaces of said washer.

References Cited in the file of this patent

UNITED STATES PATENTS

| | | |
|---|---|---|
| 1,960,927 | Siegert | May 29, 1934 |
| 2,368,744 | Carey | Feb. 6, 1945 |
| 2,442,622 | Starr | June 1, 1948 |
| 2,595,878 | Parsons | May 6, 1952 |
| 2,608,422 | Allinquant | Aug. 26, 1952 |
| 2,647,809 | Schindler | Aug. 4, 1953 |
| 2,687,908 | Vorech | Aug. 31, 1954 |
| 2,687,910 | Petch et al. | Aug. 31, 1954 |
| 2,753,958 | Whisler | July 10, 1956 |
| 2,806,721 | Fagg et al. | Sept. 17, 1957 |

FOREIGN PATENTS

| | | |
|---|---|---|
| 602,913 | Great Britain | June 4, 1948 |
| 1,078,356 | France | May 12, 1954 |
| 565,387 | Great Britain | Nov. 8, 1954 |
| 1,118,033 | France | Mar. 5, 1956 |